United States Patent
Miyamoto et al.

(10) Patent No.: US 10,487,159 B2
(45) Date of Patent: Nov. 26, 2019

(54) METHOD FOR PRODUCING (METH)ACRYLIC POLYMER HAVING SUBSTITUENT AT ONE END

(71) Applicant: Soken Chemical & Engineering Co., Ltd., Tokyo (JP)

(72) Inventors: Takeshi Miyamoto, Sayama (JP); Takahiro Okubo, Sayama (JP); Hiroto Matsumoto, Sayama (JP); Shu-ichi Goto, Sayama (JP); Shinsuke Yabunaka, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 84 days.

(21) Appl. No.: 15/757,692

(22) PCT Filed: Aug. 30, 2016

(86) PCT No.: PCT/JP2016/075331
§ 371 (c)(1),
(2) Date: Mar. 6, 2018

(87) PCT Pub. No.: WO2017/043373
PCT Pub. Date: Mar. 16, 2017

(65) Prior Publication Data
US 2019/0040164 A1 Feb. 7, 2019

(30) Foreign Application Priority Data

Sep. 9, 2015 (JP) .................. 2015-177430

(51) Int. Cl.
*C08F 2/02* (2006.01)
*C08F 2/38* (2006.01)
*C08F 20/14* (2006.01)
*C08F 20/12* (2006.01)

(52) U.S. Cl.
CPC .............. *C08F 20/14* (2013.01); *C08F 2/02* (2013.01); *C08F 2/38* (2013.01); *C08F 20/12* (2013.01); *C08F 2810/40* (2013.01)

(58) Field of Classification Search
None
See application file for complete search history.

(56) References Cited

U.S. PATENT DOCUMENTS

| | | | | | |
|---|---|---|---|---|---|
| 3,960,824 | A | * | 6/1976 | Hicks ...................... | C08F 4/00 526/85 |
| 5,574,117 | A | * | 11/1996 | Yoshida .................. | C08F 20/06 526/224 |
| 5,986,014 | A | | 11/1999 | Kusakabe et al. | |
| 9,234,094 | B2 | | 1/2016 | Wakao et al. | |
| 2003/0023012 | A1 | | 1/2003 | Okamoto et al. | |
| 2004/0162407 | A1 | * | 8/2004 | Okamoto .................. | C08F 4/00 526/314 |

FOREIGN PATENT DOCUMENTS

| | | | |
|---|---|---|---|
| EP | 2583984 A1 | | 4/2013 |
| JP | S48-17882 | | 3/1973 |
| JP | S62-250012 A | | 10/1987 |
| JP | 6-49131 A | | 2/1994 |
| JP | 2000-344823 A | | 12/2000 |
| JP | 2006-124722 A | | 5/2006 |
| JP | 2010095581 A | | 4/2010 |
| JP | 2015054936 A | * | 3/2015 |
| JP | 2015054936 A | | 3/2015 |

\* cited by examiner

*Primary Examiner* — Richard A Huhn
(74) *Attorney, Agent, or Firm* — The Webb Law Firm

(57) ABSTRACT

An object of the present invention is to achieve a high polymerization ratio and high functional group introduction ratio during production of a (meth)acrylic polymer having a functional group at one end, while suppressing formation of a disulfide. According to the constitution of the present invention, a method for producing a (meth)acrylic polymer having a functional group at one end includes subjecting a (meth)acrylic monomer to a polymerization reaction, in the presence of an inert gas containing 0.01% to 6.0% by volume of oxygen, by using, as an initiating species, a compound having a functional group and a thiol group.

11 Claims, No Drawings

METHOD FOR PRODUCING (METH)ACRYLIC POLYMER HAVING SUBSTITUENT AT ONE END

CROSS-REFERENCE TO RELATED APPLICATIONS

This application is the United States national phase of International Application No. PCT/JP2016/075331 filed Aug. 30, 2016, and claims priority to Japanese Patent Application No. 2015-177430 filed Sep. 9, 2015, the disclosures of which are hereby incorporated in their entirety by reference.

TECHNICAL FIELD

The present invention relates to a method for producing a (meth)acrylic polymer having a functional group at one molecular end, preferably by bulk polymerization, in a high polymerization ratio and high functional group introduction ratio, while suppressing formation of a disulfide.

BACKGROUND ART

A (meth)acrylic polymer having a substituent at one molecular end can be used as a starting material for a block polymer or graft polymer.

Here, as a method for producing a (meth)acrylic polymer having a substituent at one molecular end, for example, a method of subjecting a (meth)acrylic monomer to a polymerization reaction by using, as an initiating species, a compound having a thiol and a functional group as described in each of Patent Literature 1 and Patent Literature 2, and a method in which a polymerization reaction is carried out by using a halide as an initiating species, and then the halogen is substituted with a substituent as described in Patent Literature 3 are known.

In particular, in the method described in each of Patent Literature 1 and Patent Literature 2, which uses a bulk polymerization reaction, since the reaction proceeds gently, reaction control is easy, and the method is suitable for mass production, which is advantageous.

In the bulk polymerization process such as the one described above, formerly, in some cases, the reaction was carried out by introducing the air as shown in Patent Literature 4. The air contains about 20% by volume of oxygen, and because of the presence of the oxygen, reaction control is complicated, the disulfide content is increased, and transparency, which is a feature of acryl, is impaired by a side reaction of the thiol compound and the inhibitor in the monomer. For these reasons, usually, as shown in Patent Literature 5 or 6, a polymerization reaction is carried out after the air inside a reaction vessel has been displaced with a gas, such as nitrogen gas, argon gas, or carbon dioxide gas, that does not affect the polymerization reaction. That is, in each of Patent Literature 5 and Patent Literature 6, after the air inside the reaction vessel is sufficiently displaced with nitrogen gas, a polymerization reaction is carried out.

By carrying out a polymerization reaction in an inert gas atmosphere in such a manner, it was considered that the compound having a functional group and a thiol group, used as an initiating species, stably functioned as the initiating species.

However, it has become clear that the (meth)acrylic polymer produced by such a method has low polymerization stability, and when a block polymer or graft polymer is produced, the blocking ratio or grafting ratio tends to be low.

As a result of careful studies, the present inventors have found that this is caused by the fact that by carrying out a polymerization reaction in an inert gas atmosphere, the substituent introduction ratio decreases.

CITATION LIST

Patent Literature

PTL 1: JPA 1987-250012
PTL 2: JPA 2000-344823
PTL 3: JPA 2006-124722
PTL 4: JPA 1973-17882
PTL 5: JPA 1994-49131
PTL 6: JPA 2001-302405

SUMMARY OF INVENTION

It is an object of the present invention to provide a method for efficiently producing a (meth)acrylic polymer having a functional group at one molecular end, preferably by a bulk polymerization process, in a high functional group introduction ratio, while suppressing formation of a disulfide which is an impurity.

According to the present invention, a method for producing a (meth)acrylic polymer having a functional group at one end includes subjecting a monomer mixture containing a (meth)acrylic monomer to a polymerization reaction, in the presence of an inert gas containing 0.01% to 6.0% by volume of oxygen, by using, as an initiating species, a compound having a functional group, other than a thiol group, and a thiol group.

In the present invention, preferably, the polymerization reaction of the (meth)acrylic monomer is carried out in the presence of a metallocene catalyst.

In the present invention, preferably, the functional group is at least one group selected from the group consisting of a hydroxyl group, a carboxyl group, an alkoxysilyl group, an allyl group, and an amino group.

In the present invention, preferably, the compound having a functional group, other than a thiol group, and a thiol group is used in an amount in the range of 0.1 to 50 parts by weight relative to 100 parts by weight of the total of the monomer mixture containing a (meth)acrylic monomer and the compound having a functional group, other than a thiol group, and a thiol group.

In the present invention, the polymerization reaction is usually a bulk polymerization reaction.

In the present invention, preferably, the reaction temperature of the polymerization reaction is set at a temperature in the range of 60° C. to 200° C.

In the present invention, preferably, the metallocene catalyst is used in an amount in the range of 0.001 to 5.0 parts by weight relative to 100 parts by weight of the total of the monomer mixture containing a (meth)acrylic monomer and the compound having a functional group, other than a thiol group, and a thiol group.

According to the present invention, in spite of the fact that the polymerization reaction of a (meth)acrylic monomer is carried out, preferably by a bulk polymerization process, by using, as an initiating species, a compound having a functional group, other than a thiol group, and a thiol group, by mixing a very small amount of oxygen into an inert gas, the polymerization can be performed stably, the functional group introduction ratio can be improved, and also formation of a disulfide can be suppressed.

Accordingly, when a block or graft polymer is produced by using the resulting (meth)acrylic polymer, the blocking ratio or grafting ratio can be improved.

DESCRIPTION OF THE INVENTION

The method for producing a (meth)acrylic polymer according to the present invention will be described in detail below with reference to specific examples.

In the method for producing a (meth)acrylic polymer according to the present invention, the compound serving as an initiating species is a compound having a functional group, other than a thiol group, and a thiol group.

Preferably, the functional group is at least one group selected from the group consisting of a hydroxyl group, a carboxyl group, an alkoxysilyl group, an allyl group, and an amino group. These functional groups may be contained singly or in combination of two or more in the compound.

Examples of such a compound having a functional group and a thiol group include hydroxyl group-containing thiol compounds, in which the functional group is a hydroxyl group, such as mercaptomethanol, 1-mercaptoethanol, 2-mercaptoethanol, 1-mercaptopropanol, 3-mercaptopropanol, 1-mercapto-2,3-propanediol, 1-mercapto-2-butanol, 1-mercapto-2,3-butanediol, 1-mercapto-3,4-butanediol, 1-mercapto-3,4,4'-butanetriol, 2-mercapto-3-butanol, 2-mercapto-3,4-butanediol, 2-mercapto-3,4,4'-butanetriol, and thioglycerol;

compounds in which the functional group is a carboxyl group, such as α-mercaptopropionic acid, β-mercaptopropionic acid, 2,3-dimercaptopropionic acid, thioglycolic acid, o-mercaptobenzoic acid, m-mercaptobenzoic acid, thiomalic acid, thiolcarbonic acid, o-thiocoumaric acid, α-mercaptobutanoic acid, β-mercaptobutanoic acid, γ-mercaptobutanoic acid, thiohistidine, and 11-mercaptoundecanoic acid;

alkoxysilyl group-containing thiol compounds, such as 3-mercaptopropyl-trimethoxysilane, 3-mercaptopropyl-triethoxysilane, 3-mercaptopropyl-monomethyldimethoxysilane, 3-mercaptopropyl-monophenyldimethoxysilane, 3-mercaptopropyl-dimethylmonomethoxysilane, 3-mercaptopropyl-monomethyldiethoxysilane, 4-mercaptobutyl-trimethoxysilane, and 3-mercaptobutyl-trimethoxysilane;

compounds in which the functional group is an allyl group, such as allyl mercaptan; and compounds in which the functional group is an amino group, such as 2-(dimethylamino)ethanethiol, cysteamine, 2-aminothiophenol, 4-aminothiophenol, 6-amino-1-hexanethiol, and 11-amino-1-undecanethiol.

In the present invention, when the above-described compound is used as an initiating species, the compound is usually used singly.

The compound to be polymerized by using the above-described compound as an initiating species is a compound having an ethylenically unsaturated double bond, and a typical example thereof is a (meth)acrylic monomer.

The (meth)acrylic monomer used in the present invention contains a (meth)acrylic acid alkyl ester as a main component. The alkyl chain in the (meth)acrylic acid alkyl ester may be linear or branched, and examples thereof include an alkyl chain having 1 to 36 carbon atoms. Specific examples of the (meth)acrylic acid alkyl ester include methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, iso-octyl (meth)acrylate, nonyl (meth)acrylate, decyl (meth)acrylate, lauryl (meth)acrylate, stearyl (meth)acrylate, icosyl (meth)acrylate, docosyl (meth)acrylate, isostearyl (meth)acrylate, octadecyl (meth)acrylate, heptadecyl (meth)acrylate, and behenyl (meth)acrylate.

The (meth)acrylic monomer used in the present invention may be one (meth)acrylic acid alkyl ester monomer, or two or more monomers may be combined. Usually, the amount of the (meth)acrylic acid alkyl ester used is 50 to 100 parts by weight, preferably 70 to 100 parts by weight, and more preferably 90 to 100 parts by weight, relative to 100 parts by weight of the monomer mixture.

Furthermore, a monomer other than the (meth)acrylic acid alkyl ester may be combined. Examples of such a monomer include:

(meth)acrylic acid and salts such as (meth)acrylic acid alkali metal salts;

(meth)acrylic acid aryl esters, such as phenyl (meth)acrylate, benzyl (meth)acrylate, and phenoxyethyl (meth)acrylate;

(meth)acrylic acid alkoxyalkyl esters, such as methoxyethyl (meth)acrylate, ethoxyethyl (meth)acrylate, propoxyethyl (meth)acrylate, butoxyethyl (meth)acrylate, and ethoxypropyl (meth)acrylate;

(meth)acrylonitrile; vinyl acetate;

vinyl halide compounds, such as vinyl chloride, vinylidene chloride, and 2-chloroethyl (meth)acrylate;

(meth)acrylic acid esters of alicyclic alcohol, such as cyclohexyl (meth)acrylate;

polymerizable compounds containing an oxazoline group, such as 2-vinyl-2-oxazoline, 2-vinyl-5-methyl-2-oxazoline, and 2-isopropenyl-2-oxazoline;

polymerizable compounds containing an aziridine group, such as (meth)acryloylaziridine and 2-aziridinylethyl (meth)acrylate;

epoxy group-containing vinyl monomers, such as allyl glycidyl ether, glycidyl ether (meth)acrylate, and 2-ethylglycidyl ether (meth)acrylate;

hydroxyl group-containing vinyl compounds, such as 2-hydroxyethyl (meth)acrylate, 2-hydroxypropyl (meth)acrylate, monoesters of (meth)acrylic acid polypropylene glycol and polyethylene glycol, and adducts of lactones and 2-hydroxyethyl (meth)acrylate;

fluorine-containing vinyl monomers, such as fluorine-substituted (meth)acrylic acid alkyl esters;

unsaturated carboxylic acids other than (meth)acrylic acid, such as itaconic acid, crotonic acid, maleic acid, and fumaric acid, salts thereof, (partial) ester compounds thereof, and acid anhydrides thereof;

vinyl monomers containing a reactive halogen, such as 2-chloroethyl vinyl ether and vinyl monochloroacetate;

amide group-containing vinyl monomers, such as (meth)acrylamide, N-methylol(meth)acrylamide, N-methoxyethyl (meth)acryl amide, and N-butoxymethyl(meth)acrylamide;

organosilicon group-containing vinyl compound monomers, such as vinyltrimethoxysilane, γ-methacryloxypropyltrimethoxysilane, allyltrimethoxysilane, trimethoxysilylpropylallylamine, and 2-methoxyethoxytrimethoxysilane; and diene compounds, such as ethylidene norbornene, piperidine, isoprene, pentadiene, vinylcyclohexene, chloroprene, butadiene, cyclobutadiene, and methylbutadiene.

Other examples include macromonomers having a radical polymerizable vinyl group at the end of a vinyl-polymerized monomer (e.g., fluorine-based macromonomers and silicon-containing macromonomers). The amount of such a monomer other than the (meth)acrylic acid alkyl ester is 0 to 50 parts by weight, preferably 0 to 30 parts by weight, and more preferably 0 to 10 parts by weight, relative to 100 parts by weight of the monomer mixture.

The polymerization reaction by using the initiating species described above is usually carried out by a bulk polymerization process in which a solvent is not used.

In the present invention, the compound having a functional group, other than a thiol group, and a thiol group, which is used as an initiating species, is used in an amount in the range of 0.1 to 50 parts by weight, preferably 0.5 to 30 parts by weight, relative to 100 parts by weight of the total of the monomer mixture containing a (meth)acrylic monomer and the compound having a functional group, other than a thiol group, and a thiol group. When the amount of the compound having a functional group and a thiol group, which is used as an initiating species, is less than the lower limit, the polymerization reaction may not proceed efficiently. When the amount exceeds the upper limit, the polymerization reaction may proceed too quickly and become difficult to control.

In this case, the reaction proceeds by heating the reaction system. In the present invention, it is preferable to use a metallocene catalyst as a catalyst.

As the metallocene catalyst used in the present invention, a compound represented by the formula (I) below can be used.

[Chemical formula 4]

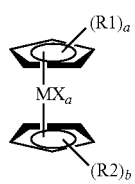

[I]

In the formula (I), M is a metal selected from the group consisting of metals of Groups 4, 5, 14 and 15 of the periodic table, cobalt, chromium, ruthenium, and palladium; R1 and R2 are each independently at least one group selected from the group consisting of optionally substituted aliphatic hydrocarbon groups, optionally substituted alicyclic hydrocarbon groups, optionally substituted aromatic hydrocarbon groups, and optionally substituted silicon-containing groups, a hydrogen atom, or a single bond, provided that R1 and R2 may cooperate to link the two five-membered rings of the compound represented by the formula [I], and provided that a plurality of adjacent groups R1 or R2 may cooperate to form a cyclic structure; a and b are each independently an integer of 1 to 5; X is a halogen atom or a hydrocarbon group in which at least part of hydrogen atoms may be substituted with a halogen atom; and n is 0 or an integer obtained by subtracting 2 from the valence of the metal M.

Specific examples of such a metallocene catalyst include titanocene compounds, such as dicyclopentadiene-Ti-dichloride, dicyclopentadiene-Ti-bisphenyl, dicyclopentadiene-Ti-bis-2,3,4,5,6-pentafluorophen-1-yl, dicyclopentadiene-Ti-bis-2,3,5,6-tetrafluorophen-1-yl, dicyclopentadiene-Ti-bis-2,5,6-trifluorophen-1-yl, dicyclopentadiene-Ti-bis-2,6-difluorophen-1-yl, dicyclopentadiene-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,6-difluorophen-1-yl, and dimethylcyclopentadienyl-Ti-bis-2,6-difluoro-3-(pyrr-1-yl)-phen-1-yl; zirconocene compounds, such as dicyclopentadienyl-Zr-dichloride and dimethylcyclopentadienyl-Zr-dichloride; and ruthenocene compounds, chromocene compounds, cobaltocene compounds, and the like. These metallocene catalysts may be used singly or in combination.

The metallocene catalyst is used usually in an amount in the range of 0.001 to 5.0 parts by weight, preferably 0.005 to 0.5 parts by weight, relative to 100 parts by weight of the total of the monomer mixture containing a (meth)acrylic monomer and the initiating species. When the amount of the metallocene catalyst is less than the lower limit, the effect obtained by using the metallocene catalyst may not be exhibited. Even when the metallocene catalyst is used in an amount exceeding the upper limit, the effect of increasing the amount of the metallocene catalyst used may not be exhibited.

In the present invention, a polymerization reaction is usually carried out by a bulk polymerization process by using the components described above. In the present invention, the polymerization reaction is carried out in an inert gas atmosphere containing a small amount of oxygen.

That is, when copolymerization is performed by using the components described above, it is common to carry out a reaction after the air in the reaction system has been sufficiently displaced with an inert gas such as nitrogen gas. However, regarding the polymer obtained by carrying out a polymerization reaction in an inert gas atmosphere in the absence of oxygen, when a graft polymer is produced, the grafting ratio tends to decrease.

As a result of studies about the reason for this, it has been found that since the polymerization reaction does not proceed stably, the substituent introduction ratio decreases.

Mixing of a very small amount of oxygen into an inert gas is effective in suppressing a decrease in the substituent introduction ratio.

In the present invention, the polymerization reaction is carried out by using an inert gas containing 0.01% to 6.0% by volume of oxygen. Furthermore, use of an inert gas containing 0.05% to 1.0% by volume of oxygen is preferable. As the inert gas used, nitrogen gas, argon gas, xenon gas, carbon dioxide gas, and the like may be mentioned. In the present invention, preferably, nitrogen gas is used.

It is considered that the oxygen contained in the inert gas accepts protons separated from the —S—H group to stabilize the reaction system, thus suppressing formation of a disulfide. Such an effect of oxygen can be recognized at an oxygen concentration in the range of 0.01% to 6.0% by volume, preferably 0.05% to 1.0% by volume. When the oxygen concentration is less than the lower limit, the effect described above cannot be recognized. Furthermore, the polymerization ratio tends to decrease. On the other hand, when the oxygen concentration exceeds the upper limit, the polymerization reaction is affected, and the formation reaction of a (meth)acrylic polymer having a functional group at one end is not stabilized.

The inert gas containing 0.01% to 6.0% by volume of oxygen is used so as to sufficiently displace the air in a vessel. Usually, by allowing the oxygen-containing inert gas to flow in an amount 2 to 20 times, preferably 3 to 10 times, the volume of a reaction vessel, the gas inside the reaction vessel is displaced.

In the production method of the present invention, under the conditions described above, a polymerization reaction is carried out by using, as an initiator, the compound having a functional group and a thiol group.

The polymerization reaction is usually carried out at normal pressure, but may be carried out at increased pressure or reduced pressure.

The reaction temperature is usually set at a temperature in the range of 60° C. to 200° C., preferably 60° C. to 150° C., and more preferably 60° C. to 120° C. The reaction temperature may be set in multiple stages. That is, the reaction may be carried out at a relatively low temperature immediately after the start of the reaction, and then the reaction temperature may be increased.

The reaction time is usually set in the range of 30 minutes to 24 hours, preferably 1 to 15 hours.

By carrying out the polymerization reaction as described above, usually, 50% by weight or more, preferably 80% by weight or more, of the starting material used is allowed to react (polymerization ratio).

The polymerization ratio can be determined, for example, by measuring, by gas chromatography, the amount of an unreacted monomer in the components in a flask as described above.

After the reaction time elapses, the reaction product is cooled to room temperature, and by adding a reaction inhibitor, such as benzoquinone, to the reaction product, the reaction can be completely terminated. The reaction inhibitor is usually dissolved in an organic solvent, such as tetrahydrofuran (THF), and then added to the reaction product.

In the case where THF is used as a solvent, the reaction product is obtained as a THF solution, and the THF solution contains the reaction product, the unreacted monomer, an unreacted initiating species, a disulfide, and the like. The unreacted monomer, the unreacted initiating species, and THF serving as a solvent can be removed by distillation under reduced pressure by using a vacuum evaporator or the like.

The reaction product obtained as described above is a (meth)acrylic polymer having a functional group originating from the initiating species at one molecular end. For example, when 2-mercaptoethanol is used as the initiating species, a polymer having a thioethanol group at one end of the polymer molecule can be obtained. When 3-mercaptopropanol is used as the initiating species, a polymer having a thiopropanol group at one end of the polymer molecule can be obtained. When β-mercaptopropionic acid is used as the initiating species, a polymer in which a thiopropionic acid group is bound to one end of the polymer molecule can be obtained. When 2-(dimethylamino)ethanethiol is used as the initiating species, a polymer having an amino group at one end of the polymer molecule can be obtained. When allyl mercaptan is used as the initiating species, a polymer having an allyl group at one end of the polymer molecule can be obtained.

Regarding the functional group bound to one end of the polymer, the introduction ratio into one end can be calculated and confirmed from the amount of the initiating species and measurement of the hydroxyl value, acid value, amine value, or the like of the resulting polymer, depending on the functional group.

The weight average molecular weight measured by gel permeation chromatography (GPC) of the reaction product thus obtained is usually in the range of 500 to 100,000, and preferably in the range of 1,000 to 30,000.

By carrying out the polymerization reaction in an inert gas atmosphere to which a small amount of oxygen is added, as employed in the present invention, a polymerization ratio of 80% or more and a functional group introduction ratio of 90% or more can be achieved, and the amount of the disulfide contained in the reaction product can be suppressed within a range of 5 to 20 ppm. This is ½ to ¼ of the amount of the disulfide contained in a polymer obtained by carrying out a polymerization reaction in an inert atmosphere which does not contain oxygen.

As described above, the (meth)acrylic polymer having a polar group at one end can be obtained by the production method of the present invention in a high polymerization ratio and high substituent introduction ratio, and a graft polymer using this polymer has a high grafting ratio.

The magnitude of the grafting ratio can be estimated from the degree of branching (gM=(square of radius of gyration of branched polymer/square of radius of gyration of linear polymer)). As the grafting ratio increases, the degree of branching decreases. The degree of branching can be measured by a gel permeation chromatograph-multi-angle light scattering photometer (GPC-MALS).

In the production method of the present invention, by carrying out a polymerization reaction, which has been hitherto carried out in an inert gas atmosphere in the absence of oxygen, in an inert gas atmosphere to which a small amount of oxygen is added, it is possible to efficiently produce a (meth)acrylic polymer having high homogeneity.

The (meth)acrylic polymer obtained by the production method of the present invention can be suitably used as a starting material for a block polymer or graft polymer without causing a decrease in the blocking ratio or grafting ratio.

EXAMPLES

The present invention will be described in more detail below on the basis of examples. However, the present invention is not limited to the examples.

Example 1

Into a flask having a capacity of 1 liter and equipped with a stirrer, a gas introduction tube, a thermometer, and a reflux condenser tube were charged 90 parts by weight of 2-ethylhexyl acrylate (2EHA) and 0.3 parts by weight of titanocene dichloride as a catalyst. The gas inside the flask was displaced by allowing a nitrogen gas containing 0.3% by volume of oxygen to continuously flow from the gas introduction tube at a rate of 0.1 liter/min for 60 minutes, and the contents in the flask were heated to 95° C.

Next, 10 parts by weight of 2-mercaptoethanol was added under stirring into the flask.

After the addition of 2-mercaptoethanol, cooling and heating were performed for 2 hours so that the temperature of the contents under stirring in the flask was maintained at 95° C. Then, by performing heating and cooling so that the temperature of the contents in the flask was maintained at 100° C., the reaction was further carried out for 8 hours.

The polymerization ratio for the reaction product thus obtained was determined by measuring the residual monomer ratio by gas chromatography. The polymerization ratio was 86.2%.

Next, the resulting reaction product was moved to an evaporator, and the residual monomer and the residual thiol compound were removed by gradually heating to 80° C. under reduced pressure.

The molecular weight in terms of Mw measured by gel permeation chromatography (GPC) for the polymer thus obtained was 1,100.

Furthermore, the hydroxyl group introduction ratio for the resulting polymer, which was calculated from the amount of the initiating species used and the amount of hydroxyl group obtained from the measured hydroxyl value, was 98.2%, indicating a high probability of introduction of the hydroxyl group into one end of the polymer.

Furthermore, the disulfide concentration in the resulting polymer was measured by gas chromatograph-mass spectrometry (GC-MS) to be 15 ppm.

The results are shown in Table 1.

Examples 2 to 12, Comparative Examples 1 and 2

Polymerization was performed as in Example 1 except that the monomer composition and the amount of oxygen were changed as shown in Table 1. Furthermore, the functional group introduction ratio in Example 5 was calculated from the measured acid value, and the functional group introduction ratio in Example 7 was calculated from the measured amine value.

The results are shown in Table 1.

under stirring in the flask was maintained at 75° C. Then, 0.3 parts by weight of AIBN was added under stirring, and by performing heating and cooling so that the temperature of the contents in the flask was maintained at 75° C., the reaction was further carried out for 6 hours. The molecular weight in terms of Mw measured by gel permeation chromatography (GPC) for the polymer thus obtained was 500,000. Furthermore, the degree of branching gM was measured by GPC-MALS. As a result, gM=0.55.

Comparative Example 3

A macromonomer was obtained as in Example 13 except that the polymer obtained in Example 2 was changed for the polymer obtained in Comparative Example 1. By using the resulting macromonomer, a graft polymer was formed as in Example 13. The degree of branching gM was 0.65.

TABLE 1

| | Monomer | Parts by weight | Initiating species | Oxygen concentration vol % | Molecular weight | | | Polymerization ratio | Functional group introduction ratio % | Disulfide content ppm |
|---|---|---|---|---|---|---|---|---|---|---|
| | | | | | Mw | Mn | Mw/Mn | | | |
| Example 1 | 2EHA | 90 | 2-Mercaptoethanol | 0.3 | 1100 | 830 | 1.33 | 86.2 | 98.2 | 15 |
| Example 2 | 2EHA | 90 | 2-Mercaptoethanol | 1 | 1100 | 830 | 1.33 | 88.4 | 93.7 | 10 |
| Example 3 | 2EHA | 90 | 2-Mercaptoethanol | 5 | 1100 | 830 | 1.33 | 89.1 | 95.0 | 13 |
| Example 4 | 2EHA | 90 | 2-Mercaptopropanol | 0.3 | 1200 | 830 | 1.45 | 84.2 | 91.7 | 11 |
| Example 5 | 2EHA | 90 | β-Mercaptopropionic acid | 0.3 | 1100 | 840 | 1.31 | 86.5 | 94.4 | 9 |
| Example 6 | 2EHA | 90 | Thioglycerol | 0.3 | 1400 | 850 | 1.65 | 85.3 | 92.3 | 14 |
| Example 7 | 2EHA | 90 | 2-(Dimethylamino)ethanethiol | 0.3 | 1300 | 810 | 1.60 | 86.0 | 91.1 | 13 |
| Example 8 | BA | 90 | 2-Mercaptoethanol | 0.3 | 1100 | 810 | 1.36 | 87.0 | 98.8 | 15 |
| Example 9 | LA | 90 | 2-Mercaptoethanol | 0.3 | 1400 | 940 | 1.49 | 82.2 | 98.0 | 14 |
| Example 10 | SA | 90 | 2-Mercaptoethanol | 0.3 | 1400 | 940 | 1.49 | 81.7 | 97.1 | 12 |
| Example 11 | LA/BA | 70/20 | 2-Mercaptoethanol | 0.3 | 1300 | 850 | 1.53 | 87.0 | 95.0 | 12 |
| Example 12 | SMA | 90 | 2-Mercaptoethanol | 0.3 | 1300 | 900 | 1.44 | 85.0 | 93.0 | 13 |
| Comparative Example 1 | 2EHA | 90 | 2-Mercaptoethanol | 0 | 1100 | 820 | 1.34 | 70.7 | 88.7 | 37 |
| Comparative Example 2 | 2EHA | 90 | 2-Mercaptoethanol | 10 | 1200 | 790 | 1.52 | 88.5 | 77.3 | 167 |

2EHA: 2-ethylhexyl acrylate
BA: n-butyl acrylate
LA: lauryl acrylate
SA: stearyl acrylate
SMA: stearyl methacrylate Example 13

Into a flask having a capacity of 1 liter and equipped with a stirrer, a thermometer, and a reflux condenser tube, the polymer obtained in Example 2 and Karenz AOI manufactured by Showa Denko K.K. were charged so that equivalent amounts of hydroxyl and isocyanate groups were present, and by heating under stirring at 70° C. for 6 hours, a polymer (macromonomer) having an acryloyl group was obtained. Into a flask having a capacity of 1 liter and equipped with a stirrer, a gas introduction tube, a thermometer, and a reflux condenser tube were charged 30 parts by weight of the macromonomer, 70 parts by weight of 2EHA, and 100 parts by weight of ethyl acetate. While continuously introducing nitrogen gas in an amount of 10 liters per 100 parts by weight of the monomer for one hour, the contents in the flask were heated to 75° C. Next, 0.1 parts by weight of azoisobutyronitrile (AIBN) was added under stirring into the flask. After the addition of AIBN, cooling and heating were performed for 2 hours so that the temperature of the contents

The invention claimed is:

1. A method for producing a (meth)acrylic polymer having a functional group at one end comprising subjecting a monomer mixture containing a (meth)acrylic monomer to a polymerization reaction, in the presence of an inert gas containing 0.01% to 6.0% by volume of oxygen, by using, as an initiating species, a compound having a functional group, other than a thiol group, and a thiol group.

2. The method for producing a (meth)acrylic polymer according to claim 1, wherein the polymerization reaction is a bulk polymerization reaction.

3. The method for producing a (meth)acrylic polymer according to claim 1, wherein the compound having a functional group, other than a thiol group, and a thiol group is used in an amount in the range of 0.1 to 50 parts by weight relative to 100 parts by weight of the total of the monomer mixture containing a (meth)acrylic monomer and the compound having a functional group, other than a thiol group, and a thiol group.

4. The method for producing a (meth)acrylic polymer according to claim 3, wherein the polymerization reaction is a bulk polymerization reaction.

5. The method for producing a (meth)acrylic polymer according to claim 1, wherein the functional group is at least one group selected from the group consisting of a hydroxyl group, a carboxyl group, an alkoxysilyl group, an allyl group, and an amino group.

6. The method for producing a (meth)acrylic polymer according to claim 5, wherein the compound having a functional group, other than a thiol group, and a thiol group is used in an amount in the range of 0.1 to 50 parts by weight relative to 100 parts by weight of the total of the monomer mixture containing a (meth)acrylic monomer and the compound having a functional group, other than a thiol group, and a thiol group.

7. The method for producing a (meth)acrylic polymer according to claim 5, wherein the polymerization reaction is a bulk polymerization reaction.

8. The method for producing a (meth)acrylic polymer according to claim 1, wherein the polymerization reaction of the monomer mixture containing a (meth)acrylic monomer is carried out in the presence of a metallocene catalyst, and the metallocene catalyst is used in an amount in the range of 0.001 to 5.0 parts by weight relative to 100 parts by weight of the total of the monomer mixture containing a (meth)acrylic monomer and the compound having a functional group, other than a thiol group, and a thiol group.

9. The method for producing a (meth)acrylic polymer according to claim 8, wherein the functional group is at least one group selected from the group consisting of a hydroxyl group, a carboxyl group, an alkoxysilyl group, an allyl group, and an amino group.

10. The method for producing a (meth)acrylic polymer according to claim 8, wherein the compound having a functional group, other than a thiol group, and a thiol group is used in an amount in the range of 0.1 to 50 parts by weight relative to 100 parts by weight of the total of the monomer mixture containing a (meth)acrylic monomer and the compound having a functional group, other than a thiol group, and a thiol group.

11. The method for producing a (meth)acrylic polymer according to claim 8, wherein the polymerization reaction is a bulk polymerization reaction.

* * * * *